United States Patent [19]
Boatright et al.

[11] Patent Number: 5,822,765
[45] Date of Patent: Oct. 13, 1998

[54] SYSTEM AND METHOD FOR RESOLVING CONTENTION ARISING FROM EXECUTION OF CACHE COHERENCY OPERATIONS IN A MULTIPLE CACHE COMPUTER SYSTEM

[75] Inventors: Bryan David Boatright; Kurt Alan Feiste; Lawrence Joseph Merkel; Derek Edward Williams, all of Austin, Tex.

[73] Assignee: International Business Machines Corporation, Armonk, N.Y.

[21] Appl. No.: 572,824

[22] Filed: Dec. 14, 1995

[51] Int. Cl.⁶ .................................................. G06F 13/376

[52] U.S. Cl. ............................ 711/146; 711/141; 711/145

[58] Field of Search ...................................... 395/446, 449, 395/457, 468, 469, 470, 473, 474, 495, 472, 551, 552, 553; 711/146, 141, 145

[56] References Cited

U.S. PATENT DOCUMENTS

| | | | |
|---|---|---|---|
| 5,276,852 | 1/1994 | Callander et al. | 395/425 |
| 5,404,483 | 4/1995 | Stamm et al. | 395/425 |
| 5,442,754 | 8/1995 | Datwyler et al. | 395/325 |
| 5,442,763 | 8/1995 | Bartfai et al. | 395/375 |

*Primary Examiner*—Eddie P. Chan
*Assistant Examiner*—George F. Wallace
*Attorney, Agent, or Firm*—Anthony V.S. England

[57] ABSTRACT

A data processing system and method having a number of cache controllers coupled to a bus. A cache controller uses a buffer operably coupled to the bus for loading information from the bus. A status bit associated with a buffer indicates the buffer status. The cache controller has logic circuitry operably coupled to the bus and the buffer. The logic circuitry responds to a certain cache coherency operation by loading the buffer and waiting during a predetermined interval for a possible retry signal before further processing the operation.

11 Claims, 6 Drawing Sheets

SYSTEM AND METHOD FOR RESOLVING CONTENTION ARISING FROM EXECUTION OF CACHE COHERENCY OPERATIONS IN A MULTIPLE CACHE COMPUTER SYSTEM

FIELD OF THE INVENTION

This invention relates generally to distributed memory management for data processing systems, and more specifically may apply to systems having multiple processors with cache memory.

BACKGROUND OF THE INVENTION AND PRIOR ART

Due to trade-offs in size, speed and cost, the memory elements of data processing systems are commonly organized into a hierarchy. For example, a system may have a small, level one ("L1") memory cache located nearest a processor, a second level ("L2") memory cache which is larger and slower to access located somewhat further from the processor, and a still slower, main memory separated some distance from the processor by a system bus. Furthermore, there is a trend toward adding even further levels of memory hierarchy.

In such a distributed, hierarchical system, information required to resolve execution of an operation may not be available to a responding device within a time interval desired for a response by the device. For example, in a system with cache controllers for managing cache memory and handling processor transactions, a processor may communicate to the system bus through a cache controller. The cache controller may assist the processor by reducing processor traffic on the system bus by the cache controller monitoring ("snooping") the system bus and filtering out transactions ("snoop filtering") which the processor does not need to process. The cache controller may also automatically maintain coherence of information residing in cache memory through hardware that supports the snooping transactions on the system bus and processes coherency status information.

A significant part of a cache controller may be dedicated to a directory containing the main memory address for all the blocks of information in the cache and status information used to automatically maintain coherence. Such status information reflects, for example, whether a block of information in a cache is valid, and whether the corresponding information in another cache and in main memory is valid. In an in-line L2 cache directory there may also be an L1 cache inclusion bit which indicates whether a block of information in L2 memory is potentially included in the L1 cache.

In such a system, an L1 cache may have a memory portion dedicated exclusively to blocks of instructions and another memory portion dedicated exclusively to blocks of data. The cache directory for an L2 cache associated with such split L1 caches may not include status information necessary to maintain coherence of the L1 instruction cache, and yet for efficient use of system resources a system generally requires prompt resolution of a coherence related operation. Often, a response may be required before the L2 cache controller can obtain information needed from the L1 cache. This poses a problem because when multiple L2 cache controllers promptly respond to a coherence operation in such a system, further processing of the request may result in a series of controller responses which continue without resolution for an indefinite time (referred to variously as a "deadlock" or "livelock" condition) and degrade system performance.

The problem described above arising from lack of information in the L2 cache controller pertaining to an associated L1 instruction cache is illustrative of the more general problem which arises in distributed systems when information required to resolve execution of an operation is not available to a responding device within a time interval desired for a response by the device.

SUMMARY OF THE INVENTION

An objective of the invention is to promptly respond to a request in a distributed data processing system without creating a deadlock condition, while efficiently maintaining coherence of information in the system.

According to an embodiment of the present invention, the foregoing and other objects are attained in a system with a number of caches operably coupled to a bus. A cache controller uses a buffer operably coupled to the bus for loading information from the bus and a status bit for the buffer status, and has logic circuitry operably coupled to the bus and the buffer. Upon receiving a predetermined operation which requires a prompt response, the logic circuitry responds by loading the buffer and waiting during a predetermined interval for a possible retry signal before further processing.

The embodiment further contemplates that when a first cache controller on the bus sends a certain request and the buffer of a second cache controller on the bus is marked "not busy", the second cache controller snoops the request into the buffer. If a third cache controller on the bus outputs a retry signal, the second cache controller halts further processing of the certain request so that when the certain request is repeated by the first cache controller in response to the retry signal from the third cache controller, the certain request will be loaded into the second cache controller buffer without the second cache controller generating a retry signal, and so that no cache controller receiving the certain request fully processes the request until all the cache controllers receiving the request can fully process the request.

It is an advantage of the present invention that execution of a request is resolved using a relatively small amount of memory without encountering a deadlock condition.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

DESCRIPTION OF THE PREFERRED EMBODIMENT

Figure 1:
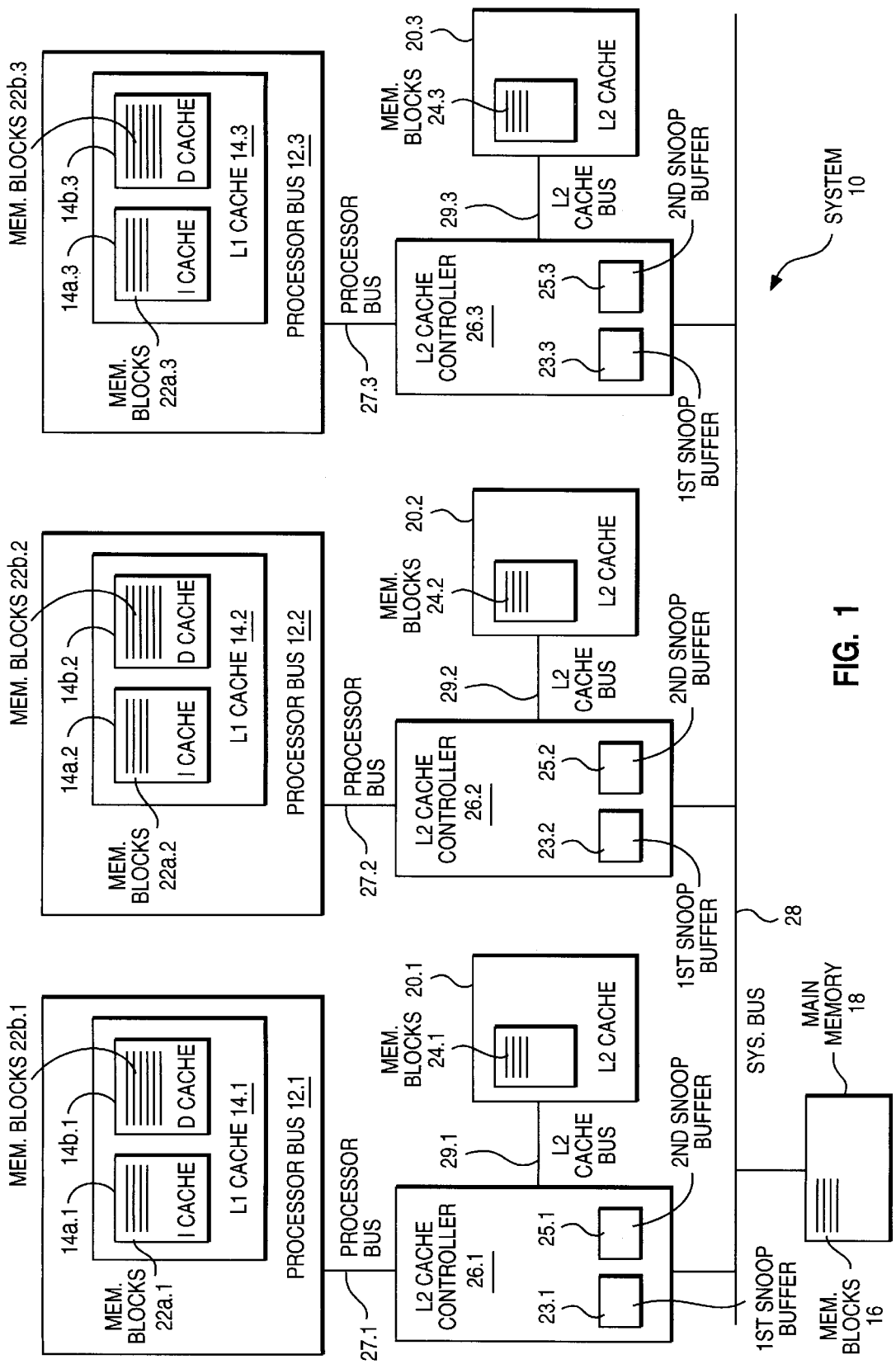
FIG. 1 is a block diagram showing general elements of a preferred embodiment of the present invention.

Referring to FIG. 1, a system 10 embodying the present invention has a processor 12.1 with a first level (L1) cache 14.1 for storing blocks of memory 16 from a main memory 18. The L1 cache 14.1 has an instruction cache portion 14*a*.1 and a separate data cache portion 14*b*.1. The processor 12.1 also is associated with and uses a second level (L2) memory cache 20.1 that is larger than the L1 cache 14.1. The blocks 22*a*.1 and 22*b*.1 (also referred to as "lines") of memory contained in the L1 cache 14.1 are maintained as a subset of the blocks 24.1 in the L2 cache 20.1. The processor 12.1 is connected by a processor bus 27.1 to an L2 cache controller 26.1. The L2 cache controller 26.1 is connected to the L2 cache 20.1 by an L2 cache bus 29.1 and to the processor 12.1 by the processor bus 27.1. The L2 cache controller 26.1 manages and services the L2 cache 20.1 and handles processor 12.1 transactions. The controller 26.1 is interposed between the processor 12.1 and a system bus 28, and is therefore referred to as a "in-line" cache controller. The processor 12.1 is thus coupled to the system bus 28 and other devices coupled thereto, including the L2 memory cache 20.1, through the in-line L2 cache controller 26.1 and the buses 27 and 29. A second L2 cache controller 26.2 is also connected to the system bus 28, and to associated processor 12.2, L1 cache 14.2, and L2 cache 20.2. Likewise, a third L2 cache controller 26.3 is connected to the system bus 28, and associated processor 12.3, L1 cache 14.3, and L2 cache 20.3. There may be up to n L2 cache controllers 26.n, processors, 12.n, etc. These devices may be referred to herein collectively or singly, for example, as "L2 cache controllers 26", "processors 12", or "an L2 cache controller 26", "a processor 12", etc. For this multi-processor application, an in-line cache L2 controller 26, such as controller 26.1, assists its associated processor 12, such as processor 12.1 associated with L2 cache controller 26.1, by reducing traffic on the processor bus 27. This is done by a cache controller 26 monitoring ("snooping") the system bus 28 and filtering out transactions ("snoop filtering") which the associated processor 12 does not need to process. For example, associated processor 12 does not need to process transactions to addresses not stored within the L1 cache 14. The cache controller 26 also maintains memory coherence through snooping transactions on the system bus 28 and processing coherency status information based on the nature of the snooped transactions and the state of affected blocks 22*b* in the associate data cache 14 and blocks 24 in the associate L2 cache 20. An L2 cache controller 26 has a first snoop buffer 23 and a second snoop buffer 25 so that certain snooped transactions may be stored by the cache controller 26 for processing.

A certain instruction, referred to herein as an instruction cache block invalidate ("ICBI") instruction, is provided for software management of coherence of instructions residing in the L1 instruction cache 14*a*. The ICBI instruction is for assigning an "invalid" coherence status to a designated block of information, and accordingly the instruction includes an address which corresponds to the address of the designated block of information. If a transaction on the system 10 results in a processor 12 modifying an instruction from the block 22*a* of instructions in the processor 12 instruction cache 14*a* then an ICBI operation may be sent to all cache controllers 26 through the system bus 28 so that if any other cache 14*a* has instructions corresponding to the same block 22*a* of instructions then the processor 12 can identify the block 22*a* of instructions as "invalid" and later re-fetch the block 22*a* if required. This ensures that all processor instruction caches remain coherent.

Figure 2:
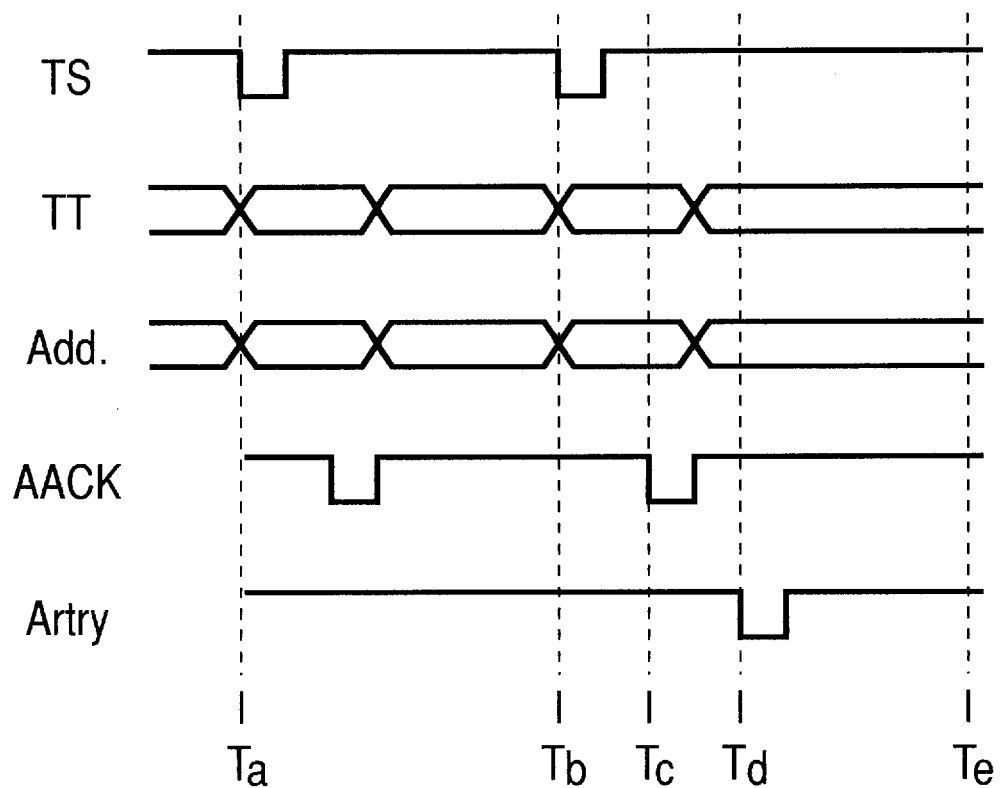
FIG. 2 is a timing diagram generally illustrating operations of the present invention.

Since it is possible that after a first ICBI operation is initiated, a second ICBI operation may be initiated before execution of the first ICBI operation has completed, a protocol is used to ensure that an ICBI operation can be cleanly executed by all affected processors before the operation is accepted by any processor. FIG. 2 illustrates the protocol in general terms and certain signals associated with an operation such as an ICBI operation. The time line shown in FIG. 2 is not to scale and the time periods between times shown, such as Ta and Tb for example, are not necessarily the same as the time period between other times, such as Tb and Tc for example.

During a first clock cycle at time Ta a device on the bus 28, e.g., cache controller 26.1, initiates a first ICBI operation. By some time, Tf, the controllers 26.2 and 26.3 will complete execution of the ICBI. According to the protocol of the present invention, if, for example, controller 26.1 initiates a second ICBI operation before time Tf, the operation is not accepted by controllers 26.2 and 26.3, and controller 26.1 must be notified that the second ICBI operation must be repeated. Then, when the operation is repeated at a time after time Tf when controllers 26.2 and 26.3 can cleanly execute the operation, the controllers 26.2 and 26.3 will accept the operation.

This protocol may be implemented according to the following signals. An ICBI operation is an "address only" transaction which uses address ("ADDR"), transaction type ("TT"), transfer start ("TS"), address acknowledge ("AACK") and address retry ("ARTRY") lines on the system bus 28. The controller 26.1 initiates a first ICBI operation by outputting TT, ADDR and TS signals. The TS signal notifies other devices on the bus, e.g., controllers 26.2 and 26.3, that the TT and ADDR signals are valid and may be snooped during the current and next clock cycles. Since this is the first ICBI operation the snoop buffer 25.2 of the second cache controller 26.2 is not busy, and the controller 26.2 loads the ICBI address into the buffer 25.2 without accessing the directory to check for a hit. Likewise, the snoop buffer 25.3 of the third cache controller 26.3 is not busy, and the third controller 26.3 loads the ICBI address into its snoop buffer 25.3.

Once a snoop buffer in a L2 cache controller contains an ICBI address for sending to the processor, the controller will send and resend the address to the processor associated with the controller until the controller receives a signal from the processor indicating the instruction has been accepted by the processor. From the time that the ICBI address has been loaded into the snoop buffer until the time that the controller is notified that the processor has accepted the address, the buffer is marked busy.

When the first controller 26.1 places another ICBI operation on the system bus 28 at time Tb, suppose that the second controller 25.2 has not been notified by the processor 12.2 that the first ICBI operation has been accepted so that snoop buffer 25.2 for the second controller 26.2 is still busy. In response to the TT, ADDR and TS signals asserted at time Tb, an AACK signal is generated at time Tc by a system arbiter (not shown) indicating to the sending cache controller 26.1 that the ADDR signals have been detected and notifying the other devices coupled to the bus 28, such as cache controllers 26.2 and 26.3, that an ARTRY signal must be asserted before a certain succeeding cycle at time Te, if at all. Since the snoop buffer 25.2 of cache controller 26.2 is busy at the time Tb of the second ICBI operation, the controller 26.2 asserts an ARTRY signal at time Td, before the time Te. Then, if the controller 26.1 resends the second ICBI operation again at some time after Tf the operation can accepted and can be cleanly executed.

Figure 3:
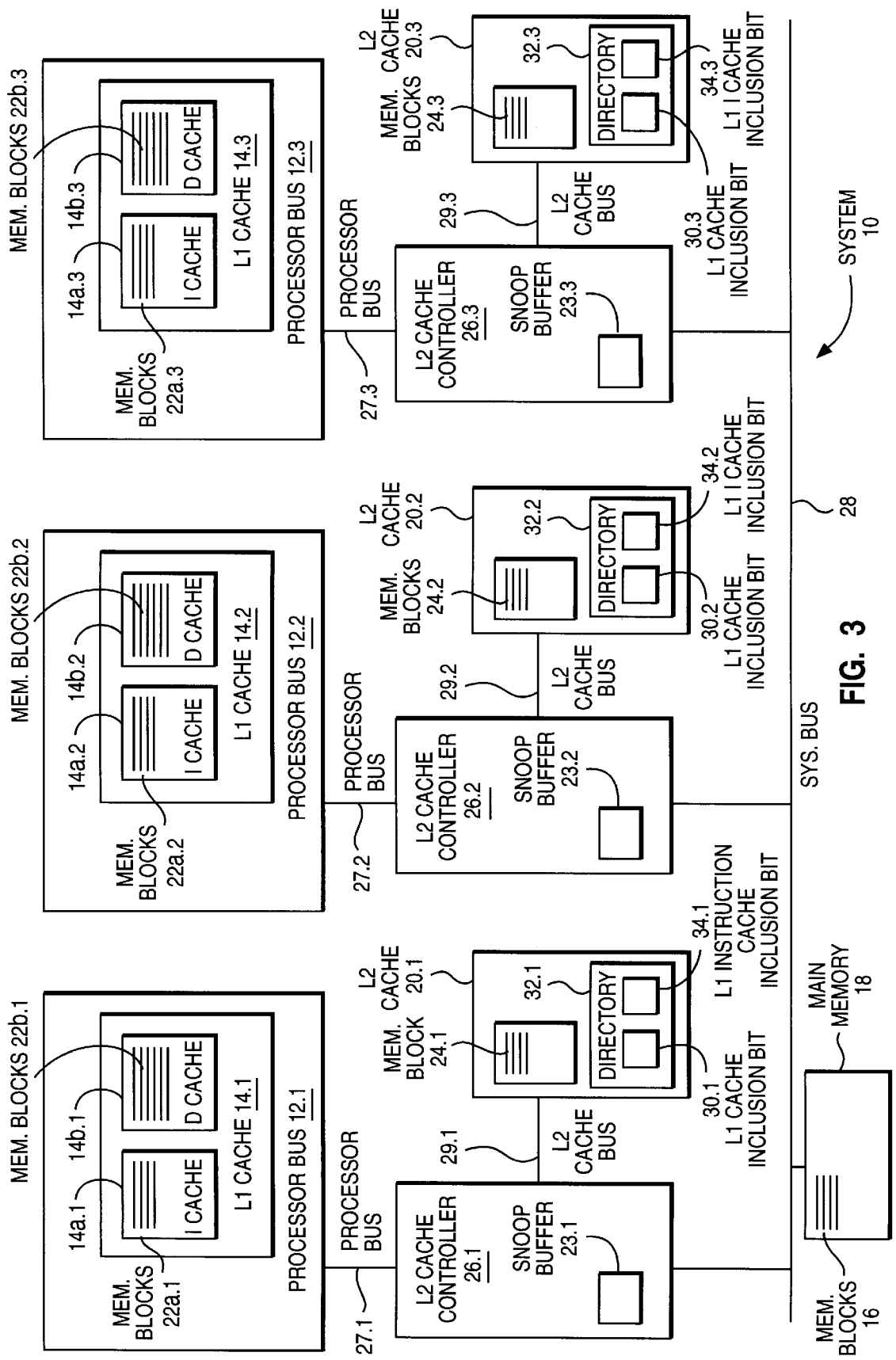
FIG. 3 is a block diagram showing certain elements of a system using inclusivity bits for maintaining instruction cache coherence.

Certain features and advantages of the preferred embodiment of the present invention as shown in FIGS 1, 2, 5 and 6 may be further understood by comparison to the system shown in FIG. 3. (FIG. 3 uses the same identifying numbers as used in FIG. 1 for elements that are in common with the system of FIG. 1.) An L1 cache inclusion bit 30 is maintained in a directory 32 in an L2 cache controller 26 for identifying whether a block 24 of memory in the L2 cache 20 has been fetched into the L1 cache 14. An L1 instruction cache inclusion bit 34 in the L2 cache directory 32 designates whether a block 24 of memory was sent to the L1 cache 14 as a result of an instruction fetch. If the block 24 is sent to data cache 14b then its coherence will be automatically maintained by other aspects of the system and there is no need for the cache controller 26 to respond to ICBI instructions from other processors 12 or controllers 26. However, if the block 24 is sent to an instruction cache 14a then the hardware will not automatically maintain memory coherence, and the controller 26 must respond to snooped ICBI instructions. That is, when cache controller 26 snoops an ICBI instruction on the system bus 28, the controller 26 determines whether the block 24 identified by the address in the ICBI instruction corresponds to a block 22a or 22b of memory in the L1 cache 14 by referring to the L1 cache inclusion bit 30 in the L2 cache directory 32. (This mechanism wherein a first processor or cache controller monitors the system bus and detects an operation from a second processor or controller which affects the first processor or controller is referred to as a "snoop hit"). If there is a snoop hit then the cache controller 26 checks an L1 instruction cache inclusion bit 34 in the L2 directory 32 to determine whether the block 24 has previously been sent to the processor L1 instruction cache 14a so that a corresponding block 22 may reside in the cache 14a. If so, then the controller 26 sends the ICBI instruction to the processor 12, and the controller 26 clears its instruction cache inclusion bit 34. If the processor 12 determines that the block 22 is still in the L1 instruction cache 14a then the processor 12 updates an L1 cache directory (not shown) to indicate that the block 22 is invalid.

A problem arises with the above described inclusion bit based system for implementing the ICBI instruction due to the amount of memory required in the L2 cache directory 32 for the L1 instruction cache inclusion bit 34. Since the bit 34 is required for each block 24 in the cache 20, and there are a number of blocks 24, a substantial amount of memory must be provided in the directory 32, for this purpose.

Another system does not require certain status information as described above to be kept in the directory 32 for the purpose of instruction coherence, but is limited because it may result in devices in the system 10 encountering a deadlock condition. This non-inclusion bit based, but deadlock-prone system uses the single snoop buffer 23 in the L2 cache controller 26 in the system of FIG. 1, but does not use the instruction cache inclusion bit 34 shown in FIG. 3.

Figure 4:
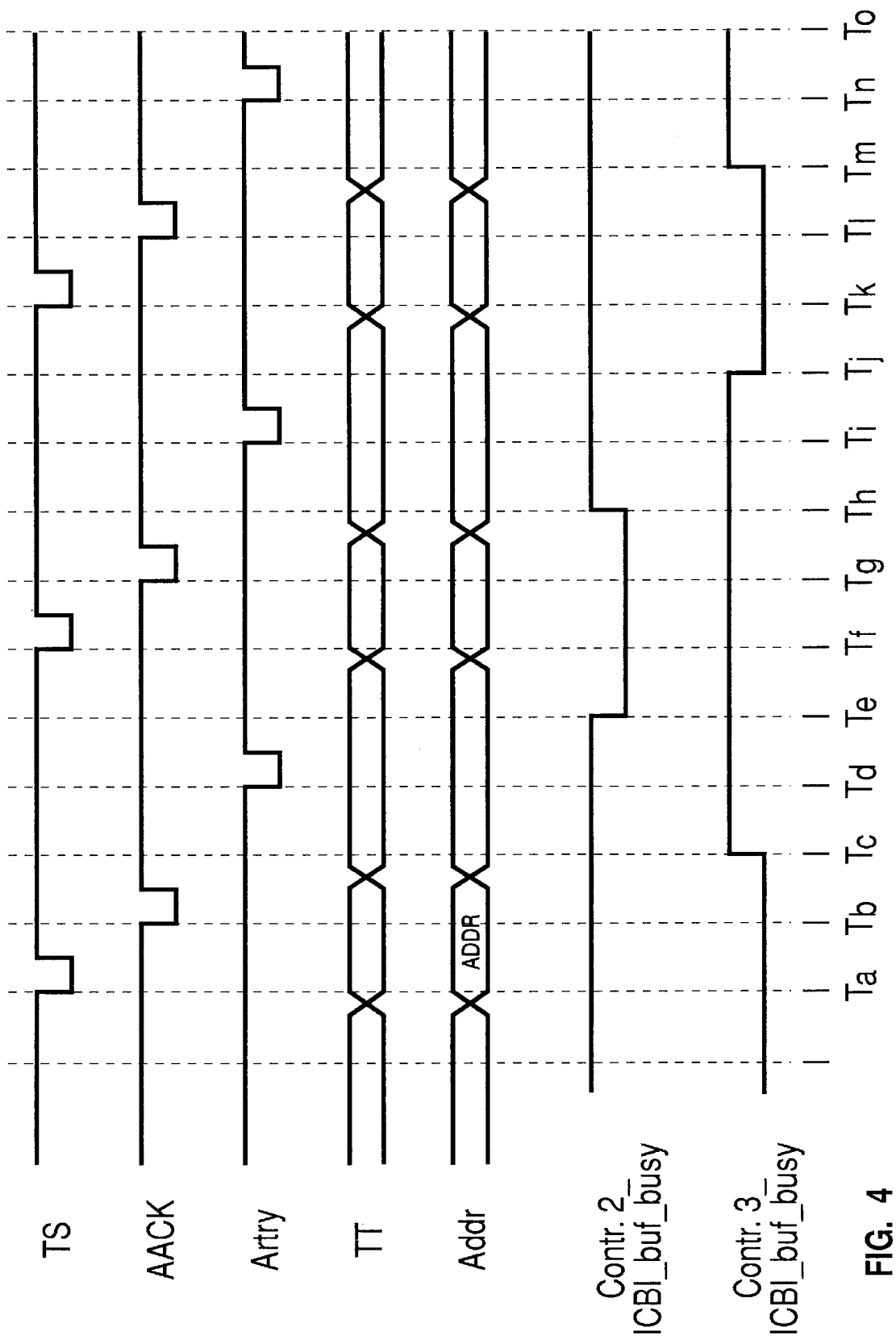
FIG. 4 is a timing diagram illustrating a deadlock condition.

FIG. 4 illustrates the protocol and timing of signals for the non-inclusion bit based version of the system shown in FIG. 3. For this system a deadlock may occur for example, when the second controller 26.2 snoop buffer 23.2 is busy and the third controller 26.3 snoop buffer 23.3 is free and the controller 26.1 for the first processor 12.1 outputs an ICBI operation to the bus 28 at time Ta. At time Tb the system arbiter (not shown) generates an AACK signal in response to the ICBI request. Also in response to the ICBI request asserted at time Ta, the third controller 26.3 loads the ICBI instruction into its snoop buffer 23.3 at time Tc. Also, the second controller 26.2 detects the ICBI operation from the first controller 26.1 and detects the busy snoop buffer 23.2, so that the second controller 26.2 asserts an address retry signal ("ARTRY") on the bus 28 to the first controller 26.1 at time Td (prior to a certain predetermined time following the AACK signal).

Meanwhile, assume the buffer of 23.2 of the second controller 26.2 has become free at time Te. In response to the ARTRY signal, the first controller 26.1 sends the ICBI operation again at time Tf. At time Tg the system arbiter (not shown) generates an AACK signal in response to the ICBI operation. Also in response to the ICBI instruction repeated at time Tf, the second controller 26.2 loads the instruction into buffer 23.2 at time Th. Meanwhile, the third controller 26.3 asserts an ARTRY signal at time Ti because the third controller 26.3 snoop buffer 23.3 is still busy due to the ICBI operation issued at time Ta by the first controller 26.1. Assume that at time Tj the buffer 23.3 of the third controller 26.3 has become free. The first controller repeats the ICBI operation at time Tk in response to the ARTRY signal asserted at time Ti by the third controller 26.3. In response to the ICBI operation, the system arbiter (not shown) generates an AACK signal at time Tl and the controller 26.3 loads the ICBI address into the buffer 23.3 at time Tm, but The second controller 26.2 snoop buffer 23.2 is busy with the ICBI instruction issued at time Tf so that at time Tn the second controller 26.2 issues another ARTRY signal.

This cycle of the second controller 26.2 and third controller 26.3 repeatedly asserting ARTRY signals to the first controller 26.1 may continue indefinitely. While this cycle may not completely occupy the second processor 12.2 and third processor 12.3, it does degrade their performance. Moreover, the first processor 12.1 can eventually become deadlocked due to exclusively servicing the ARTRY signals from the second and third controllers 26.

Figure 5:
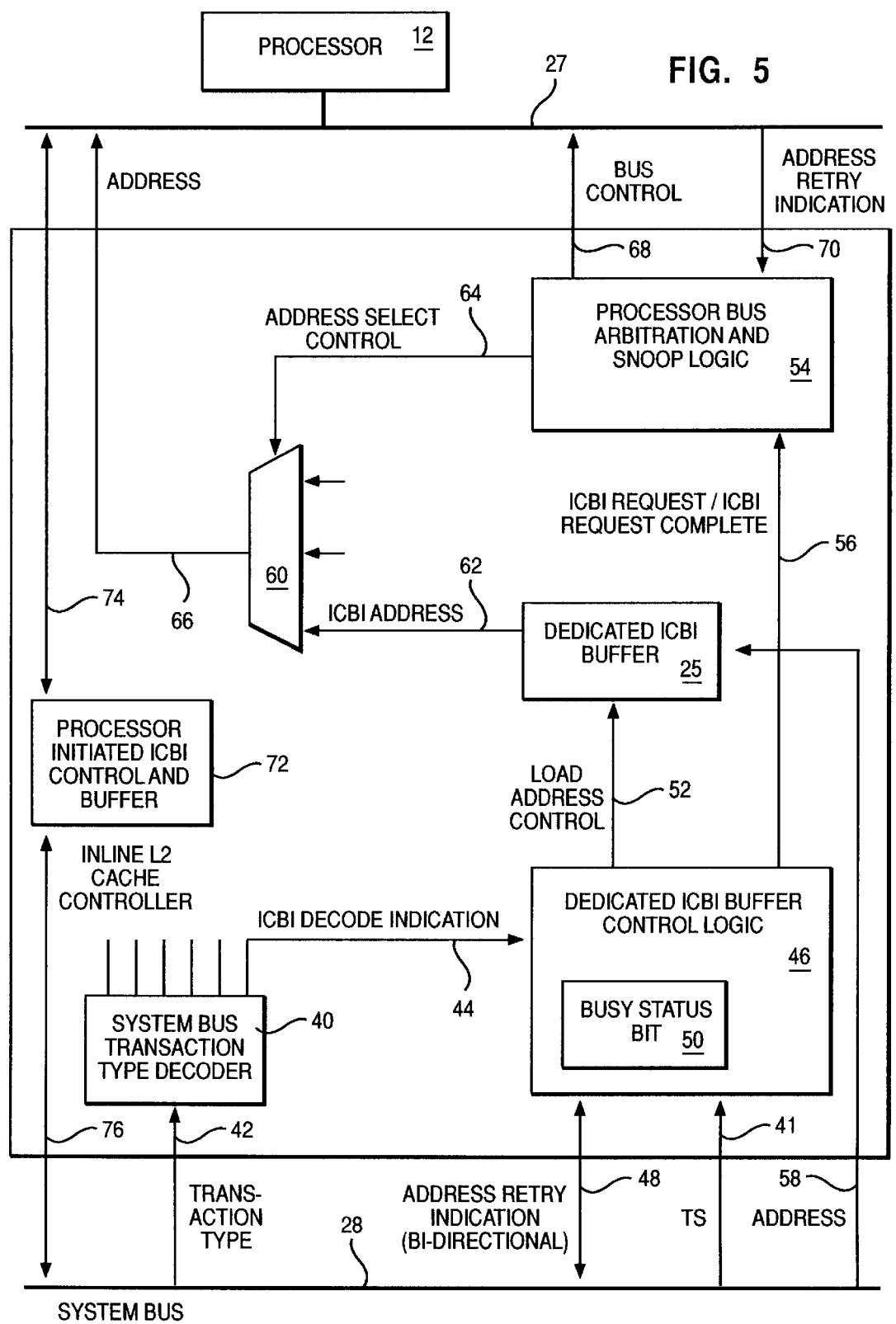
FIG. 5 is a block diagram showing more detailed elements of the preferred system of FIG. 1.

The preferred embodiment of the present invention avoids the memory requirements of the inclusion bit based version of the system shown in FIG. 3 and has certain features for avoiding the deadlock which may occur with the non-inclusion bit based version of the system shown in FIG. 3. Referring now to FIG. 5, an L2 controller of the present invention is illustrated in more detail than in FIG. 1. In the system 10 of FIGS. 1 and 5 the L2 cache controllers 26 have a first snoop buffer 23 (not shown in FIG. 5) and second snoop buffer 25 (the "ICBI snoop buffer"), wherein the second buffer 25 is for storing ICBI operations. The ICBI snoop buffer 25 reduces the likelihood of occurrence of a deadlock such as described for the non-inclusion bit based system of FIG. 3, since the ICBI snoop buffer 25 will not be busy with non-ICBI operations. To eliminate the possibility of a deadlock, L2 cache controllers 26 according to the present invention have certain additional elements and implement a certain protocol.

With regard to receiving and processing of an ICBI request, a controller 26 has a decoder 40 receiving TT signal inputs from the system bus 28 TT lines 42 and outputting a ICBI decode signal over a decode indication line 44 to an ICBI buffer control logic element 46 in response to an ICBI request on the bus 28. The logic element 46 inputs and outputs ARTRY signals to and from system bus 28 retry lines 48 and has a busy status bit 50 for indicating whether the ICBI buffer is busy. The buffer control logic element 46 outputs a load address control signal to the ICBI buffer 25 over a control signal line 52 and an ICBI request signal to a processor bus arbitration and snoop logic element 54 ("processor bus arbiter") over request/request complete signal lines 56. The buffer control logic 46 also inputs an ICBI request complete signal from the arbiter 54 over the line 56. The ICBI buffer 25 inputs and stores address signals from address lines 58 to the system bus and outputs a stored address to a multiplexing unit (mux) 60 over buffer address lines 62. The mux 60 inputs an address select control signal from the arbiter 54 over a select control line 64. In response to this address select control signal, the mux 60 reads the ICBI address from the ICBI buffer 25 and outputs the address over address lines 66 to the processor bus 27. The processor bus arbitration and snoop logic element 54 outputs bus control signals over control lines 68 and inputs ARTRY signals over retry lines 70 connecting the element 54 to the processor bus 27 in order to control communication between the L2 cache controller 26 and the processor 12.

The control element 46 inputs a transaction start signal from a TS line 41 connected to the system bus 28 indicating that a valid transaction is asserted on the bus 28. The decoder 40 inputs a transaction type signal from lines 42 connected to the bus. When an ICBI operation is asserted on the bus 28 the decoder 40 responds by outputting an ICBI decode signal over the decode indication line 44 to the dedicated ICBI buffer control element 46, notifying the ICBI control element 46. The control element 46 qualifies the ICBI decode indication based on the transaction start signal.

If the ICBI buffer status bit 50 indicates the buffer 25 is busy when the ICBI control element 46 receives the ICBI decode signal from the decoder 40, then the element 46 outputs an ARTRY signal to the system bus 28 over line 48. If the buffer status bit 50 indicates the buffer 25 is not busy when the ICBI control element 46 receives the ICBI decode signal from the decoder 40, then the element 46 outputs an ICBI load address control signal over line 52 to the ICBI buffer 25 indicating that an ICBI operation is on the bus 28. Then, the buffer 25 inputs an ICBI address over address lines 58 from the system bus 28. Then, if the control element 46 does not detect an ARTRY signal before a certain time (which in the present embodiment is before the end of the clock cycle after the system arbiter (not shown) asserts an AACK signal in response to the ICBI transaction), the ICBI control element 46 outputs an ICBI request signal to the arbiter 54 over line 56 and toggles the buffer status bit 50 to indicate the buffer 25 is now busy. But if the control element does detect an ARTRY signal before the certain time, the element 46 toggles the status bit 50 to indicate that the buffer 25 is not busy and the element 46 does not output the ICBI request signal in response to the ICBI load signal.

In response to the ICBI request signal inputted to the processor bus arbiter 54 from the ICBI control element 46, the arbiter 54 sends the ICBI operation to the processor 12 by signalling the multiplexer 60 over the address select line 64 so that the multiplexer 60 outputs the ICBI address to the processor bus 27 from the ICBI buffer 25, and by the arbiter 54 outputting a transaction start signal and an ICBI transaction type signal, followed by an AACK signal, to the processor bus 27. If the processor 12 cannot process the ICBI address, then the processor 12 sends an ARTRY signal to the processor bus 27 so that the arbiter 54 will resend the ICBI operation. If the arbiter 54 does not receive an ARTRY signal from the processor 12 before a certain time, then the arbiter 54 outputs an ICBI request complete signal to the dedicated ICBI buffer control element 46 and in response the buffer control element 46 toggles the status bit 50 to indicate the buffer 25 is no longer busy, and the L2 cache controller is now ready to receive another ICBI instruction.

With regard to sending an ICBI request, a controller 26 has a control/buffer element 72 coupled to the processor bus 27 by lines 74 and to the system bus 28 by lines 76 for receiving a request, such as requested execution of an ICBI instruction, on the processor bus from processor 12 and asserting the request on the system bus 28. When a processor 12 asserts an ICBI instruction on the processor bus 27, the processor 12 waits for an acknowledgement signal from the control/buffer element 72 indicating that there has been no retry request from another controller 26 in response to the ICBI request.

Figure 6:
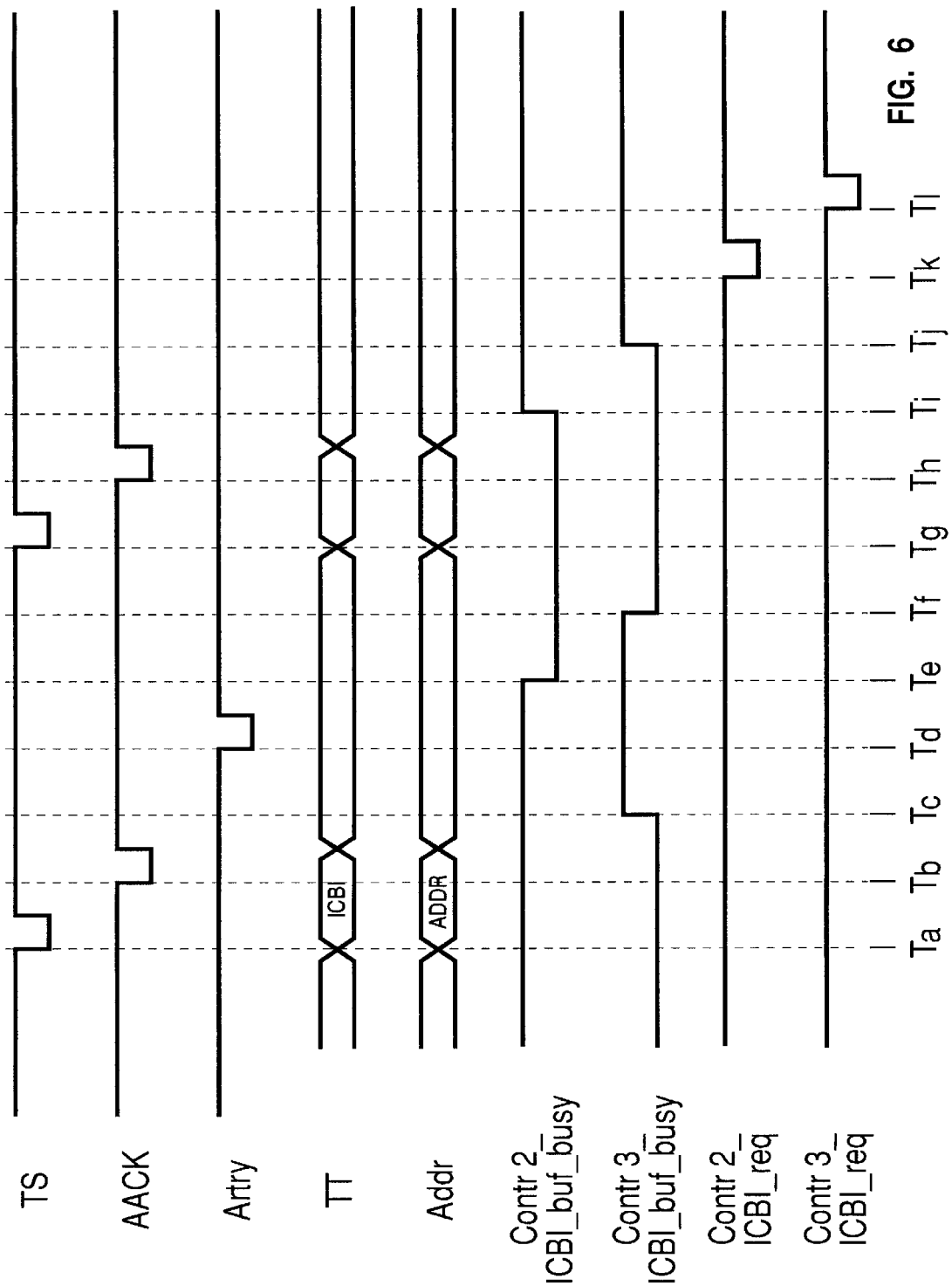
FIG. 6 is a timing diagram illustrating a cache coherence operation using a protocol of the preferred system of FIGS. 1 and 5.

The timing diagram of FIG. 6 illustrates certain signals of a complete ICBI instruction cycle for the system of FIGS. 1 and 5. The time line shown in FIG. 6 is not to scale and the time periods between times shown, such as Ta and Tb for example, are not necessarily the same as the time period between other times, such as Tb and Tc for example. For simplicity some signals described in the discussion of FIG. 5, such as the load address control signal which is output by control element 46, are not shown in FIG. 6. FIG. 6 particularly shows, in contrast to FIG. 5, how a second and third L2 cache controller of the present invention successfully execute an ICBI instruction requested by a first L2 cache controller without encountering deadlock. Beginning again with the circumstance as described in connection with FIG. 4, the second controller 26.2 snoop buffer 25.2 is busy and the third controller 26.3 snoop buffer 25.3 is free and the controller 26.1 for the first processor 12.1 outputs an ICBI operation to the bus 28 at time Ta. Outputting an ICBI operation includes the controller 26.1 asserting TS, TT and Addr signals on the bus 28, wherein the Addr signals designate a block of information affected by the ICBI operation, the TS signal indicates the start of a transfer, and the TT signals indicate that the type of transfer is an ICBI operation. At time Tb the system arbiter (not shown) generates an AACK signal in response to the ICBI request. Also in response to the ICBI request asserted at time Ta, the third controller 26.3 loads the ICBI address into its snoop buffer 25.3 at time Tc. The controller 26.3 element 46.3, however, waits for a certain time for a possible ARTRY signal on the bus 28 before requesting the processor bus arbiter 54.3 to process the ICBI operation (i.e., before posting the request for further processing by the arbiter 54.3 and, ultimately, the processor 12.3). Meanwhile, the second controller 26.2, in response to the ICBI request asserted at time Ta, detects the busy snoop buffer 25.2, and the second controller 26.2 asserts an address retry signal ("ARTRY") on the bus 28 at time Td, which is during the clock cycle following the AACK signal, or more generally stated, is prior to a certain predetermined time following the AACK signal and during the time that the controller 26.3 element 46.3 waits for a possible ARTRY signal. Then, assume the buffer of 25.2 of the second controller 26.2 becomes free at time Te. The element 46.3 cancels the posting of the request in response to the ARTRY signal asserted at time Td, and thereby does not request the arbiter 54.3 to process the ICBI address in the buffer 25.3 at time Tf. Also, in response to the ARTRY signal, the first controller 26.1 sends the ICBI operation again at time Tg. At time Th the system arbiter (not shown) generates an AACK signal in response to the ICBI operation. Then, in response to the ICBI instruction repeated at time Tg, the second controller 26.2 and the third controller 26.3 both load the ICBI address into buffers 25.2 and 25.3 respectively at times Ti and Tj. The controllers 26.2 and 26.3 then wait for a certain time for a possible ARTRY signal on the bus 28 before requesting the arbiters 54.2 and 54.3 to process the ICBI operation. This time, however, no ARTRY signal is asserted because neither of the buffers 25.2 and 25.3 were busy when the ICBI operation was requested the second time at time Tg. After the certain time has elapsed and no ARTRY signal has occurred the controllers 26.2 and 26.3 elements 46.2 and 46.3 set the status bits 50.2 and 50.3 to indicate the buffers 25.2 and 25.3 are busy, and post the ICBI request to the arbiters 54.2 and 54.3 by outputting an ICBI request signal over lines 56.2 and 56.3 at times Tk and Tl respectively. Deadlock has thus been avoided due to the structure and protocol of the system 10 of FIGS. 1, 5 and 6.

Although the present invention and its advantages have been described in detail, it should be understood that various changes, substitutions and alterations can be made without departing from the spirit and scope of the invention as defined by the following claims.

What is claimed is:

1. A data processing system comprising:

a plurality of cache controllers operably coupled to a bus;

a plurality of buffers operably coupled to the bus for loading information from the bus;

wherein such a cache controller has logic circuitry operably coupled to the bus and an associated one of the buffers the buffer being used for processing a certain cache coherency operation; and wherein in response to the certain cache coherency operation on the bus, when the associated buffer is not available such a cache controller responds by sending a retry signal, and when the associated buffer is available, the logic circuitry initiates loading of said cache coherency operation into the controller's associated buffer and waits during a predetermined time interval for a retry signal before initiating further processing of the operation.

2. The system of claim 1, wherein, in a responding controller which has loaded the buffer in response to a certain operation, the responding controller logic circuitry halts processing of the certain operation in response to a retry signal received during the predetermined time interval.

3. The system of claim 2, wherein, in a responding controller which has loaded the buffer in response to a certain operation, the responding controller logic circuitry toggles a status bit of the associated buffer to a "busy" status if a retry signal is not received during the predetermined time interval.

4. The system of claim 3, a responding controller further comprising:

control circuitry operably coupled to the logic circuitry and the buffer; and wherein, when a responding controller has loaded the buffer in response to the certain operation, the responding controller control circuitry requests the logic circuitry to further process the operation if a retry signal is not received during the predetermined time interval.

5. The system of claim 4, further comprising:

a number of caches coupled to the bus with blocks of information stored therein, a cache being associated with a cache controller; and a cache controller further comprises:

a decoder operably coupled to the bus and the logic circuitry; and sending circuitry operably coupled to the bus for sending the certain cache coherency operation; and wherein the sending circuitry issues a certain operation, including an address of a block of information stored in one of the caches, the decoder responds by notifying the logic circuitry of the certain operation, and the logic circuitry responds by loading the address into the buffer if the buffer is not busy.

6. The system of claim 5, a controller further comprising a second buffer operably coupled to the bus; and wherein the first buffer is dedicated to handling the certain operation.

7. In a data processing system, a method for processing a cache coherency operation comprising the steps of:

a) sending, by a first cache controller, a certain cache coherency operation for processing by second and third, responding cache controllers, wherein a certain buffer of such a responding cache controller is used for processing the cache coherency operation, and wherein when the certain buffer is not available, such responding cache controller sends a retry signal in response to the requested operation;

b) loading the operation into its certain buffer by such a responding cache controller which has its certain buffer available; and c) waiting, by the responding controller, during a predetermined interval immediately after loading the operation into its certain buffer, for a retry signal before further processing the operation.

8. The method of claim 7, comprising the step of:

d) halting processing of the operation and making its certain buffer available, by the responding controller which has loaded the operation into its certain buffer, in response to receiving such a retry signal during the predetermined interval.

9. The method of claim 8 further comprising:

f) setting a buffer status indication for the certain buffer to a "busy" status, by a responding controller which has loaded the buffer, if a retry signal is not received within the predetermined time interval.

10. The method of claim 9, wherein a) further comprises sending the operation by a first controller servicing a block of information residing in one memory device to at least one responding controller servicing other memory devices, including, as part of the certain operation, an address designating the block affected by the operation.

11. The method of claim 10, further comprising:

g) responding to the retry signal by the first controller repeating the certain operation.

* * * * *